US012034870B2

(12) United States Patent
Phan et al.

(10) Patent No.: US 12,034,870 B2
(45) Date of Patent: Jul. 9, 2024

(54) METHOD FOR SECURELY DIVERSIFYING A GENERIC APPLICATION STORED IN A SECURE PROCESSOR OF A TERMINAL

(71) Applicant: THALES DIS FRANCE SAS, Meudon (FR)

(72) Inventors: Guillaume Phan, Paris (FR); Emmanuel Lepavec, Paris (FR); Nicolas Vienne, Orsay (FR); Olivier Poncelet, Rueil Malmaison (FR); Evangelos Spyropoulos, Champigny sur Marne (FR)

(73) Assignee: THALES DIS FRANCE SAS, Meudon (FR)

( * ) Notice: Subject to any disclaimer, the term of this patent is extended or adjusted under 35 U.S.C. 154(b) by 84 days.

(21) Appl. No.: 17/792,432

(22) PCT Filed: Dec. 23, 2020

(86) PCT No.: PCT/EP2020/087805
§ 371 (c)(1),
(2) Date: Jul. 13, 2022

(87) PCT Pub. No.: WO2021/148223
PCT Pub. Date: Jul. 29, 2021

(65) Prior Publication Data
US 2023/0037536 A1 Feb. 9, 2023

(30) Foreign Application Priority Data
Jan. 24, 2020 (EP) .................................. 20305059

(51) Int. Cl.
*H04L 9/32* (2006.01)
*H04L 9/08* (2006.01)

(52) U.S. Cl.
CPC .......... *H04L 9/3265* (2013.01); *H04L 9/0825* (2013.01); *H04L 9/3271* (2013.01)

(58) Field of Classification Search
CPC ... H04L 9/3265; H04L 9/0825; H04L 9/3271; H04L 9/3247; G06F 21/45
See application file for complete search history.

(56) References Cited

U.S. PATENT DOCUMENTS

| 10,735,945 | B2* | 8/2020 | Lee ....................... H04L 9/3271 |
| 2011/0099367 | A1* | 4/2011 | Thom .................. H04L 9/3247 |
| | | | 713/181 |

(Continued)

FOREIGN PATENT DOCUMENTS

WO 2017082966 A1 5/2017

OTHER PUBLICATIONS

International Search Report (PCT/ISA/210) and Written Opinion (PCT/ISA/237) dated Mar. 17, 2021, by the European Patent Office as the International Searching Authority for International Application No. PCT/EP2020/087805—[11 pages].

*Primary Examiner* — Khalid M Almaghayreh

(57) ABSTRACT

Provided is a method for securely diversifying a generic application stored in a secure processor of a terminal, said method comprising: Generating at the request of a manager application hosted in an application processor of said terminal, at the level of a distant server, a server challenge; Sending said server challenge to said application; Generating a first message at said application, said first message being function of said server challenge, an application challenge and an unique identifier of said application; Sending said first message to a Root-Of-Trust service hosted in a secure processor of said terminal, said Root-of-Trust service generating an attestation of said first message, said attestation guaranteeing that said first message has not been modified and originates from said secure processor; and (Continued)

Transmitting said attestation of said first message to said distant server in an enablement request message.

4 Claims, 3 Drawing Sheets

(56) References Cited

U.S. PATENT DOCUMENTS

| | | | |
|---|---|---|---|
| 2011/0289315 A1* | 11/2011 | Laitinen | H04L 9/321 |
| | | | 380/44 |
| 2015/0359026 A1 | 12/2015 | Iwai et al. | |
| 2016/0099811 A1* | 4/2016 | Hawblitzel | H04L 9/3268 |
| | | | 713/176 |
| 2016/0099923 A1* | 4/2016 | Golla | H04L 63/168 |
| | | | 713/171 |
| 2018/0234837 A1* | 8/2018 | Lee | H04W 8/183 |
| 2020/0367049 A1* | 11/2020 | Lee | H04W 12/35 |
| 2021/0126801 A1* | 4/2021 | Nix | H04L 9/0861 |
| 2022/0166620 A1* | 5/2022 | Oladimeji | H04L 63/04 |

\* cited by examiner

METHOD FOR SECURELY DIVERSIFYING A GENERIC APPLICATION STORED IN A SECURE PROCESSOR OF A TERMINAL

The present invention concerns telecommunications and in particular a remote and secure enablement of a generic (non-diversified) application (e.g. integrated UICC, also called iUICC, or eUICC for embedded UICC) loaded and running in a Secure Processor (SP) part of a System-on-Chip (SoC) part of a connected device (i.e. with network access). The device (or terminal) is for example a smartphone, a PDA, an IoT device, having a connection to a cellular network (2G, 3G, 4G or 5G). The application can thus be an application allowing a secure element to connect to the network of a MNO (Mobile Network Operator) with all of the required credentials.

We consider a SoC including a main Application Processor (AP) and a Secure Processor (SP). The AP and the SP are isolated from each other and only communicate with each other using specific hardware and secure protocols. Such isolation provides higher security to sensitive applications loaded and running in the SP. Applications loaded in the SP are known as SP Applications.

In such a configuration, a SP Application (SP.APP in the following) needs to be deployed on a number of devices/SPs, this SP.APP being initially loaded in a generic, non-diversified form. That is, the same software and data (that do not contain any diversified identifier or credential) are initially loaded on all the devices/SPs.

The problem to be solved is the secure diversification of identifiers and credentials for this generic (non-diversified) form of SP.APP loaded on a particular device/SP, in order to subsequently be able to communicate with each diversified SP.APP instance in a secure manner.

A typical example is the secure diversification of an iUICC in a SP on a mobile phone/device. The environment required for the invention is further refined as follows:

The AP can run high level applications and provide them with access to high level services such as network access. In particular, the SoC includes a modem allowing the AP to access the network. On the other hand, SP applications running on the SP cannot access the network directly.

The SP provides a Root-Of-Trust (ROT) service to the SP applications, i.e. a signature service able to generate a cryptographic attestation for an arbitrary message (provided by SP.APP), such attestation guaranteeing that the message hasn't been modified and originates from a particular SP/device.

The SP also provides an ID service to SP applications, which can be used to retrieve a SP.ID, i.e. a unique identifier bound to the SP (i.e. either a unique identifier of the SP itself or some piece of data that can only be provided by this SP and not any other SP), or some data allowing to generate such an identifier (bound to the SP) or a universally unique identifier (i.e. independent of the SP). If not universally unique, SP.ID may be or may allow to generate an identifier unique within the range of SPs manufactured by a given SP maker. The ID service is described separately for the sake of clarity but may actually be embodied by the ROT service (e.g. SP.ID could be retrieved from an attestation generated by the ROT service).

The SP application has been loaded on the SP in a secure manner, that is, the loading operation has been authorized and guarantees the integrity and origin of the SP application, and the SP application (SP.APP) is a genuine and authorized software.

The invention proposes a method for securely diversifying a generic application stored in a secure processor of a terminal, the method comprising:

Generating at the request of a manager application hosted in an application processor of the terminal, at the level of a distant server, a server challenge;

Sending the server challenge to the application;

Generating a first message at the application, the first message being function of the server challenge, an application challenge and an unique identifier of the application;

Sending the first message to a Root-Of-Trust service hosted in a secure processor of the terminal, the Root-of-Trust service generating an attestation of the first message, the attestation guaranteeing that the first message has not been modified and originates from the secure processor;

Transmitting the attestation of the first message to the distant server in an enablement request message;

At the level of the distant server:
  Verifying that the attestation of the first message has been provided by the Root-of-Trust service;
  Verifying that the first message contains the server challenge;
  Returning to the application an enablement payload containing a second message and a public key certificate holding the public key that shall be used to verify a signature of the second message, the second message being composed of the application challenge;

At the level of the application, when receiving the enablement payload:
  Verifying the public key certificate;
  Verifying the signature of the second message;
  Verifying that the second message contains the application challenge.

Preferably, the enablement payload also contains additional and suitably diversified data from the distant server.

Advantageously, the application is the application of an iUICC.

In a preferred embodiment, the first message also contains a public key of the application and the second message also contains a certificate of the application.

Figure 1:
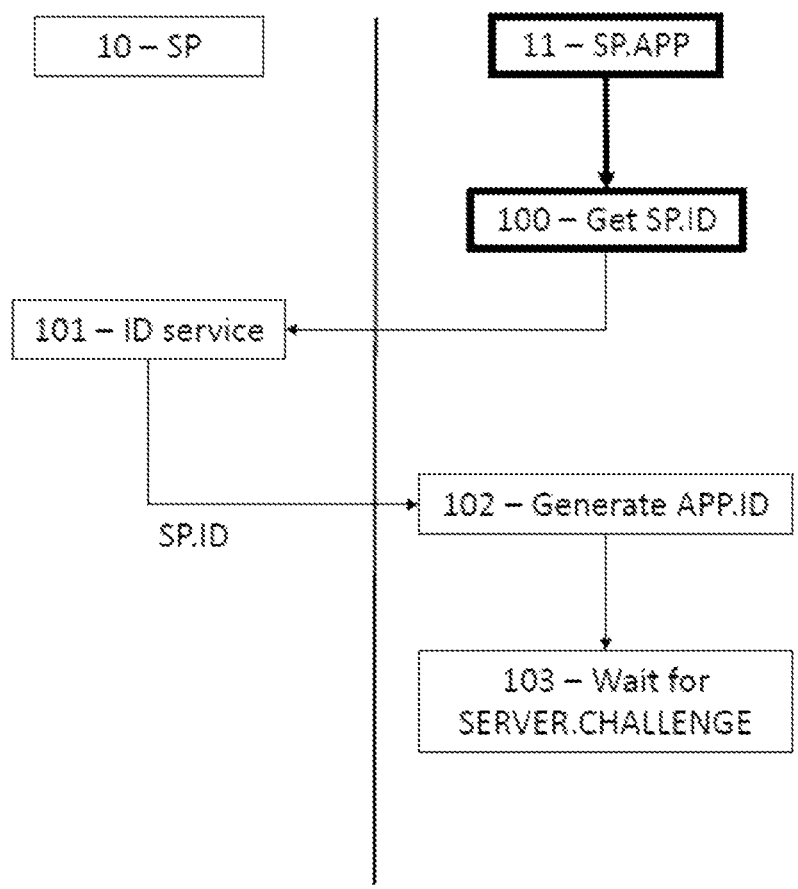
FIG. 1 represents a preliminary step intended to request a server challenge.
Figure 2A:
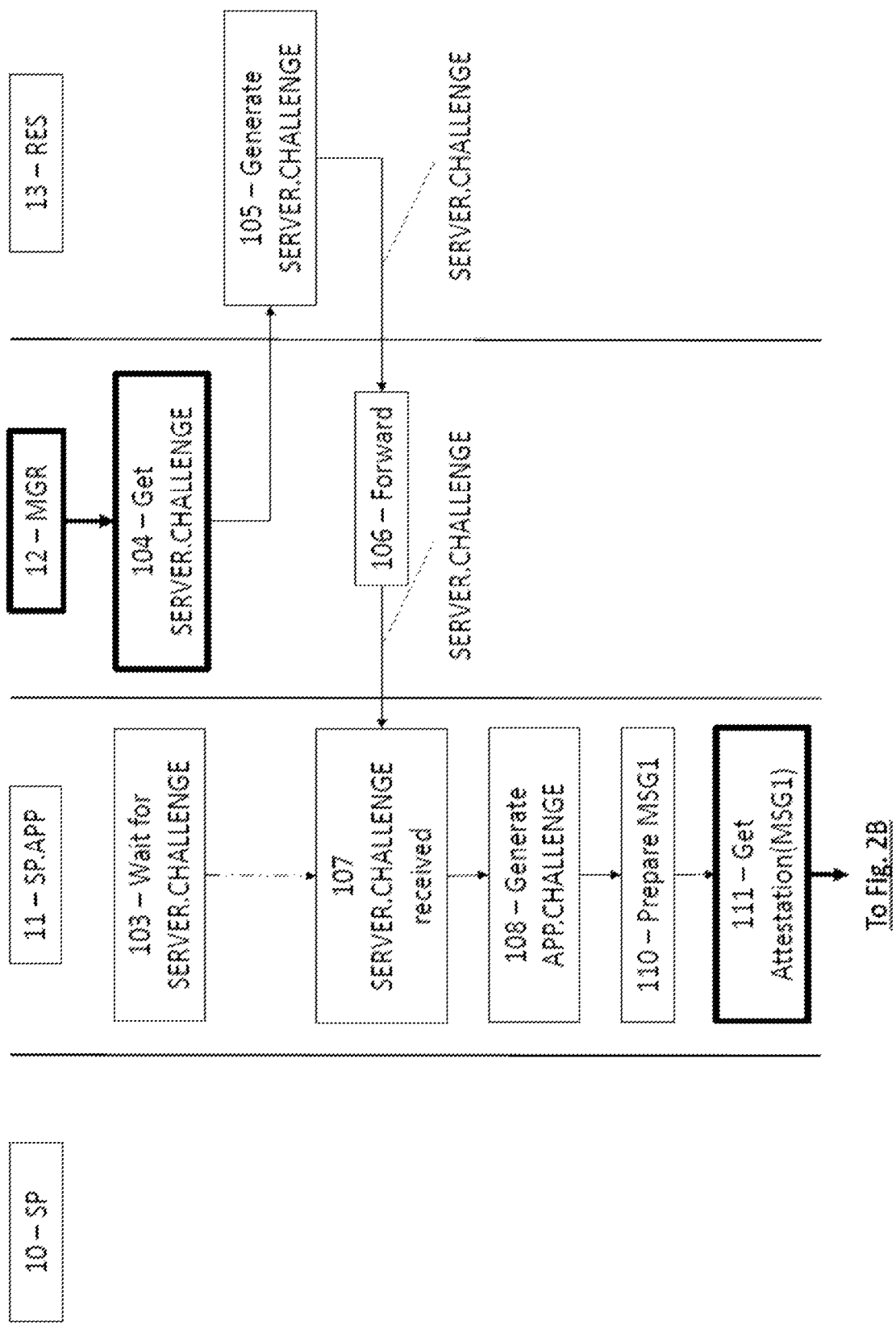
FIGS. 2A and 2B represent steps following those represented in FIG. 1.
Figure 2B:
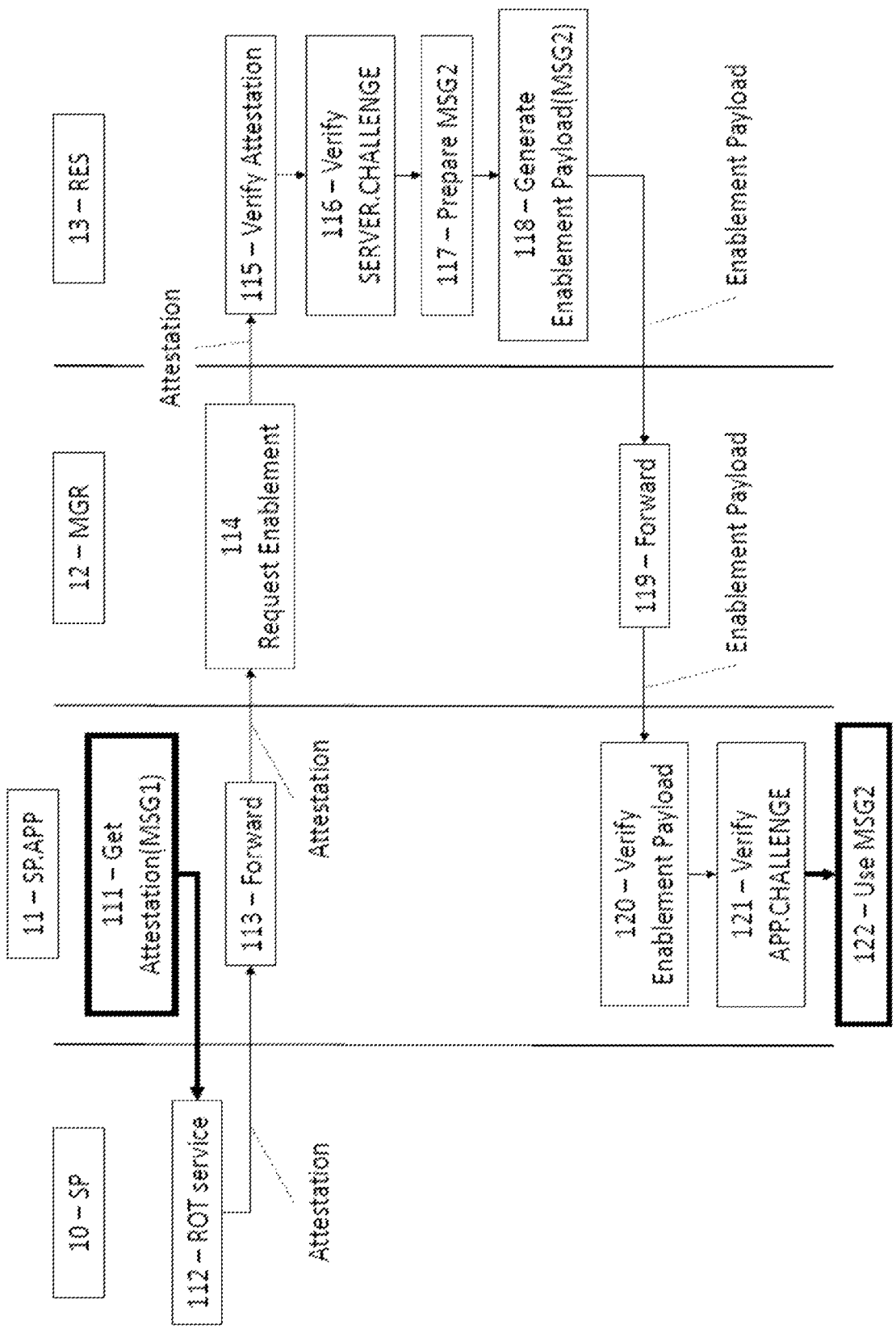

The invention is composed of the following elements, as represented in FIGS. 1, 2A and 2B that represent the different steps of the method according to the invention:

A secure processor SP 10 provided by a chip manufacturer;

A generic application (not diversified) SP.APP 11 stored in the SP 10;

A manager application (MGR 12) running on the application processor AP and able to:
  communicate with SP.APP 11,
  relay messages between SP.APP 11 and a Remote Enablement Service/Web Server (RES 13);

The server RES 13 that is a distant server.

The SP 10, SP.APP 11 and MGR 12 are part of the terminal/device. It is assumed that RES 13 is owned and managed by the provider of SP.APP 11.

The method according to the invention comprises different steps that will be explained hereafter, by using PKI (Public Key Infrastructure) to securely transmit messages and provide integrity. As a preliminary step, illustrated in FIG. 1, SP.APP has to generate a unique identifier APP.ID. To do so, the SP.APP 11 first needs to get a unique identifier of the SP (step 100), which is done by sending a request to an ID service 101 managed by the SP 10. The ID service returns SP.ID which is used in step 102 by SP.APP 11 to generate its own unique identifier APP.ID.

Step 102 may be implemented in various ways to guarantee the unicity of APP.ID. For example if SP.ID is already a unique identifier, APP.ID could be simply equal to SP.ID. However, this won't usually be the case for the following reasons:

For applicative reasons, APP.ID may need to use a specific format/encoding.

If SP.ID is only unique in the context of a particular SP maker, APP.ID may additionally include an identifier of the SP maker (later called SP.MK.ID) to become unique irrespective of the SP maker. If not retrieved somehow from the SP 10, this SP.MK.ID may be provided by SP.APP 11 itself. Notice however that the invention does not exclude use cases where such an SP.MK.ID wouldn't be needed, e.g. if the SP.ID provided by the ID service 101 would already be universally unique or if the applicative solution in general would be bound and restricted to a particular SP Maker.

Then SP.APP waits for a server challenge (step 103) that will be later generated by RES 13. Steps 100 to 103 may be performed the first time SP.APP 11 is launched.

Subsequently or concurrently to steps 100 to 103, the MGR 12 may request a server challenge from RES 13, which corresponds to step 104 illustrated in FIG. 2A. In step 105, RES 13 generates a random challenge SERVER.CHALLENGE and returns it to MGR 12. In step 106, MGR 13 simply forwards SERVER.CHALLENGE to SP.APP 11. In step 107, the SP.APP 11, previously waiting, receives SERVER.CHALLENGE and can now move to step 108 where it generates a random challenge APP.CHALLENGE. In step 110, the SP.APP 11 then generates a message MSG1 that includes the following information:

SERVER.CHALLENGE;

APP.CHALLENGE;

APP.ID;

Optionally, MSG1.DATA: application-dependent data that may be used by RES 13 to generate an Enablement Payload;

Optionally, complementary information (e.g. SP.MK.ID) that may be used by RES 13 to enforce an enablement acceptance policy.

In step 111, the SP.APP 11 then gets an attestation for MSG1, which is done by sending a request to a Root-Of-Trust (ROT) service 112 managed by the SP 10, illustrated in FIG. 2B.

The ROT service 112 generates and returns an Attestation which includes MSG1 and guarantees that the MSG1 has not been modified and originates from the SP 10.

In step 113, the SP.APP 11 simply forwards the Attestation to the MGR 12. In step 114, the MGR 12 wraps the Attestation into an enablement request and sends it to RES 13. The enablement request may contain SP.MK.ID if needed by RES 13 to detect the format of the Attestation (which is specific to the SP 10).

Upon reception of the enablement request, the RES 13 then:

Verifies at step 115 that the Attestation has been generated by the ROT service 112 and extracts MSG1 from the Attestation.

It is assumed that RES 13 knows the public key required to verify the Attestation (e.g. communicated in advance by the SP 10 maker);

Optionally, RES 13 enforces an enablement acceptance policy based on complementary information present in MSG1;

Verifies at step 116 that MSG1 (extracted from the Attestation) contains the SERVER.CHALLENGE previously generated at step 105;

Prepares at step 117 a message MSG2 which is to be returned to the SP.APP 11 and which includes the following information:

APP.CHALLENGE (extracted from MSG1);

Optionally, MSG2.DATA: application-dependent data, possibly dependent of MSG1.DATA Generates at step 118 an Enablement Payload which includes MSG2 and guarantees that the MSG2 has not been modified and originates from the RES 13. The Enablement Payload includes the following information:

A public key certificate (CERT.RES) holding the public key (PK.RES) that shall be used to verify MSG2.SIG (see below);

MSG2;

MSG2.SIG: signature of MSG2 generated using SK.RES (private key counterpart of PK.RES).

The RES 13 returns the Enablement Payload which is forwarded by MGR 12 to SP.APP 11 in step 119.

Upon reception of the Enablement Payload, the SP.APP 11 then:

Verifies at step 120 that the Enablement Payload has been generated by the RES 13. To do so, the SP.APP 11:

Verifies the certificate CERT.RES present in the Enablement Payload. It is assumed that SP.APP 11 knows the public key required to verify CERT.RES (included in the generic, non-diversified form of SP.APP 11);

Extracts the public key PK.RES from the certificate CERT.RES;

Verifies the signature MSG2.SIG using the public key PK.RES;

Verifies at step 121 that MSG2 contains the APP.CHALLENGE previously generated at step 108.

Finally, in step 122, the Enablement Payload is deemed successfully verified and SP.APP 11 can further use or store MSG2.DATA as needed to complete its initialization.

After step 122, the SP.APP 11 has a unique identity APP.ID, has notified RES 13 of its existence and identity (APP.ID), and may have received additional data from RES 13 (MSG2.DATA), suitably diversified or that may have been used by SP.APP 11 to finalize the diversification of its internal data.

In a first variant of the invention, we further describe the contents and purpose of MSG1.DATA and MSG2.DATA as follows:

SP.APP 11 generates a public key pair, composed of a public key (PK.APP) and a private key (SK.APP). It is assumed here that SP.APP 11 is able to perform Public Key Cryptography operations. SP.APP 11 then includes the following information in MSG1.DATA:

PK.APP

If RES 13 accepts the Enablement Request message 117, it includes the following information in MSG2.DATA:

CERT.APP (holding PK.APP, previously extracted from MSG1.DATA) and signed by RES using SK.APP.PROVIDER (private key counterpart of PK.APP.PROVIDER). This certificate is bound to APP.ID (i.e. APP.ID appears in the certificate).

CERT.APP.PROVIDER holding the public key (PK.APP.PROVIDER) that shall be used to verify CERT.APP. It is assumed that this certificate was previously signed by an independent authority (ROOT.APP) relevant for the applicative solution.

Optionally: complementary application-dependent information relevant for SP.APP 11

CERT.APP.PROVIDER and CERT.RES are independent. CERT.RES is used to secure the Enablement Procedure whereas CERT.APP.PROVIDER belongs to the certificate chain used by SP.APP 11 to authenticate itself to other parties in the applicative solution.

Upon successful verification of the Enablement Payload, SP.APP 11 can store CERT.APP.PROVIDER, CERT.APP and any provided complementary information extracted from MSG2.DATA as needed.

At the end of the Enablement Procedure (as per this first variant), SP.APP 11 also has a public key pair (PK.APP, SK.APP) certified by ROOT.APP (i.e. a relevant authority for the applicative solution) and can perform operations such as:

Communicating its identity to other parties in the applicative solution.

Proving its identity to and/or signing messages sent to other parties in the applicative solution, using SK.APP, CERT.APP (bound to APP.ID) and CERT.APP.PROVIDER, i.e. SP.APP 11 can sign messages with SK.APP and other parties can verify such signatures using the certificate chain (CERT.APP.PROVIDER F CERT.APP).

Thus, in this first variant, SP.APP 11 also generates a key pair (public/private). The public key and APP.ID are both included in MSG1, then RES 13 generates a certificate for the public key and sends it back to SP.APP 11 in MSG2.

In a second variant of the invention built upon the first variant, several ROOT.APP exist and may be involved in the applicative solution, in which case SP.APP 11 may generate several public key pairs (PK.APP, SK.APP) and each one may be certified by a different ROOT.APP. In this case, MSG1.DATA would include several PK.APP and for each one, an identifier (ROOT.ID) of the ROOT.APP that shall certify it. In this case, MSG2.DATA would include several certificate chains (CERT.APP.PROVIDER←CERT.APP), one for each PK.APP, assuming RES 13 also owns a CERT.APP.PROVIDER for each ROOT.APP indicated in MSG1.DATA.

At the end of the Enablement Procedure (as per this second variant), SP.APP 11 would then be able to use any of its public key pairs (PK.APP, SK.APP) and related certificate chains to securely communicate with other parties in the applicative solution.

Thus, in this second variant, SP.APP generates multiple key pairs instead of just one.

In a third variant of the invention built upon the first or the second variants, the certificate chain from a CERT.APP to a ROOT.APP may include more than two certificates (i.e. not just CERT.APP.PROVIDER←CERT.APP), in which case each certificate chain present in MSG2.DATA would include a variable number of certificates (i.e. CERT.ROOT. APP← . . . ←CERT.APP.PROVIDER←CERT.APP).

Thus, in this third variant, RES 13 returns a chain of certificates of variable length (greater than or equal to two, instead of just two certificates: CERT.APP.PROVIDER and CERT.APP) for each public key (i.e. case of multi-level hierarchy).

In a fourth variant of the invention, MSG2.DATA includes suitable information to suggest or force a different APP.ID for SP.APP. This means that RES 13 returns an alternative APP.ID that SP.APP 11 shall store and use instead of the one generated at step 102.

The invention provides a solution for the diversification of an Integrated UICC (iUICC) in a SP on a mobile phone.

Traditional diversification procedures such as those used for UICC or eUICC typically involve databases and Key Management Systems (KMS) storing secrets and scripts that shall be loaded onto the produced cards.

An iUICC cannot be personalized in a production site in the same way, because it must be loaded in a SP, itself in a SoC, itself in a terminal which is assembled in an OEM factory. So the invention proposes a solution for personalizing/diversifying the iUICC remotely.

The advantages of the invention is that (in case of an iUICC application being SP.APP 11) the iUICC generates its own secrets and credentials so the RES 13 doesn't have to store any secret about the multiple iUICC instances. The RES 13 is only requested to certify the public key(s) of the iUICC.

The iUICC (SP.APP) generates its own identity (APP.ID) based on the SP.ID. Even if at the very beginning (before enablement) the iUICC (SP.APP 11) cannot prove its identity, this still provides opportunities for early identification.

The invention not only provides a solution for the diversification of an iUICC in a SP 10 on a mobile phone, but generalizes to any kind of SP.APP and any kind of IoT device that includes a SP 10. In a certain way, it could also apply to the diversification of an eUICC or chip.

The invention claimed is:

1. A method for securely diversifying a generic application stored in a secure processor of a terminal, said method comprising:

Generating at the request of a manager application hosted in an application processor of said terminal, at the level of a distant server, a server challenge;

Sending said server challenge to said application;

Generating a first message (MSG1) at said application, said first message (MSG1) being function of said server challenge, an application challenge and an unique identifier (APP.ID) of said application;

Sending said first message (MSG1) to a Root-Of-Trust service hosted in the secure processor of said terminal, said Root-of-Trust service generating an attestation of said first message, said attestation guaranteeing that said first message (MSG1) has not been modified and originates from said secure processor;

Transmitting said attestation of said first message (MSG1) to said distant server in an enablement request message;

At the level of said distant server:

Verifying that said attestation of said first message (MSG1) has been provided by said Root-of-Trust service;

Verifying that said first message (MSG1) contains said server challenge;

Returning to said application an enablement payload containing a second message (MSG2) and a public key certificate holding the public key that shall be used to verify a signature of said second message (MSG2), said second message (MSG2) being composed of said application challenge; and At the level of said application, when receiving said enablement payload:

Verifying said public key certificate;

Verifying said signature of said second message; and

Verifying that said second message (MSG2) contains said application challenge.

2. The method according to claim 1 wherein said enablement payload also contains additional and suitably diversified data from said distant server.

3. A method according to wherein said application is the application of an Universal Integrated Circuit Card (UICCA.

4. The method according to claim 3 wherein said first message (MSG1) also contains a public key (PK.APP) of said application and wherein said second message (MSG2) also contains a certificate of said application.

\* \* \* \* \*